(12) United States Patent
Fischer

(10) Patent No.: US 7,690,243 B2
(45) Date of Patent: Apr. 6, 2010

(54) METHOD AND APPARATUS FOR MEASUREMENT OF THE THICKNESS OF THIN LAYERS BY MEANS OF MEASUREMENT PROBE

(75) Inventor: Helmut Fischer, Oberägeri (CH)

(73) Assignee: Immobiliengesellschaft Helmut Fischer GmbH & Co. KG, Sindelfingen (DE)

( * ) Notice: Subject to any disclaimer, the term of this patent is extended or adjusted under 35 U.S.C. 154(b) by 249 days.

(21) Appl. No.: 11/803,703

(22) Filed: May 15, 2007

(65) Prior Publication Data

US 2007/0289361 A1 Dec. 20, 2007

(30) Foreign Application Priority Data

May 15, 2006 (DE) .............. 10 2006 022 882

(51) Int. Cl.
*G01B 13/08* (2006.01)
(52) U.S. Cl. ...................................... 73/37.5
(58) Field of Classification Search ............ 73/37.5
See application file for complete search history.

(56) References Cited

U.S. PATENT DOCUMENTS

| | | | |
|---|---|---|---|
| 3,194,055 A | 7/1965 | Knobel | |
| 3,528,002 A | 9/1970 | Dunlavey | |
| 4,647,855 A | 3/1987 | Berglund | |
| 4,742,299 A | 5/1988 | Stone | |
| 5,742,167 A | 4/1998 | Haynes | |
| 6,315,858 B1* | 11/2001 | Shinozuka et al. ..... | 156/345.33 |
| 6,318,153 B1 | 11/2001 | Dumberger et al. | |
| 6,331,890 B1* | 12/2001 | Marumo et al. .............. | 356/369 |
| 6,349,588 B1* | 2/2002 | Brown et al. .................... | 73/37 |
| 7,271,888 B2* | 9/2007 | Frodis et al. ............. | 356/237.1 |
| 7,303,383 B1* | 12/2007 | Sreenivasan et al. ..... | 425/174.4 |
| 7,488,051 B2* | 2/2009 | Silverbrook .................. | 347/40 |
| 2002/0006876 A1* | 1/2002 | Hongo et al. ................ | 505/191 |

FOREIGN PATENT DOCUMENTS

| | | |
|---|---|---|
| DE | 41 19 903 A1 | 12/1992 |
| EP | 0 315 315 A1 | 5/1989 |
| GB | 839 996 A | 6/1960 |
| GB | 1 188 083 A | 4/1970 |

(Continued)

*Primary Examiner*—Hezron Williams
*Assistant Examiner*—Rodney T Frank
(74) *Attorney, Agent, or Firm*—Kriegsman & Kriegsman

(57) ABSTRACT

The invention relates to a method and an apparatus for measurement of the thickness of thin layers by means of a measurement probe (11) which has a housing (14) which holds at least one sensor element (17) whose longitudinal axis lies in particular on a longitudinal axis (16) of the housing (14), in which at least during the measurement process, a gaseous medium is supplied to a supply opening (21) of the measurement probe (11) on a measurement surface (28), and is supplied via at least one connection channel (24), which is connected to the supply opening (21), to one or more outlet openings (26) which are provided on an end face (29), pointing towards the measurement surface (28), of the measurement probe (11), and in which at least one mass flow, which flows out of one or more outlet openings (26), of the gaseous medium is directed at the measurement surface (28), and in which the measurement probe (11) is held in a non-contacting manner with respect to the measurement surface (28) during the measurement process.

10 Claims, 1 Drawing Sheet

FOREIGN PATENT DOCUMENTS

| | | |
|---|---|---|
| GB | 1 352 777 A | 5/1974 |
| GB | 1 406 274 A | 9/1975 |
| GB | 1 450 181 A | 9/1976 |
| GB | 2 042 179 A | 9/1980 |
| GB | 2 124 380 A | 2/1984 |

\* cited by examiner

METHOD AND APPARATUS FOR MEASUREMENT OF THE THICKNESS OF THIN LAYERS BY MEANS OF MEASUREMENT PROBE

INCORPORATION-BY-REFERENCE OF FOREIGN PRIORITY DOCUMENT

Applicant herein incorporates by reference the following foreign priority document: German Appln. No. 10 2006 022 882.0, filed May 15, 2006.

BACKGROUND OF THE INVENTION

The invention relates to a method and an apparatus for measurement of the thickness of thin layers by means of a measurement probe.

DE 41 19 903 A1 discloses a method and an apparatus for measurement of the thickness of thin layers in which a non-destructive layer-thickness measurement is carried out. In this case, a sensor element is provided which is placed on the measurement surface via a cup attachment in order to subsequently carry out a measurement which is based on the eddy-current principle. Alternatively, magnet-inductive measurement methods may also be used, depending on the materials to be tested.

In tactile measurement methods such as these, the cup attachment rests on the measurement surface. This results in a defined distance from the measurement surface. This requires the provision of a clean layer which has a certain minimum hardness in order to carry out the measurement. However, further fields of application are known in which the requirement is to test a layer with a soft surface and with a moist or only partially cleaned layer surface.

SUMMARY OF THE INVENTION

The invention is therefore based on the aim of providing a method and apparatus for measurement of the thickness of thin layers by means of a measurement probe, which does not adversely affect the measurement surface.

According to the invention, there is provided a measurement probe for an apparatus for measurement of the thickness of thin layers, the probe having a housing which holds at least one sensor element whose longitudinal axis lies on a longitudinal axis of the housing, a supply opening to which a connection for supplying a gaseous medium is fitted, and which has an outlet opening which is provided on an end face of the measurement probe, pointing towards a measurement surface, and having a connection channel, which connects the supply opening to the outlet opening, wherein the outlet opening is provided on the longitudinal axis of the housing, and the sensor element is arranged concentrically with respect to the outlet opening, and the outlet opening is provided on a cup-shaped projection on said one end surface of the sensor element, thus resulting in the distance between the measurement probe and the measurement surface being increased adjacent to the outlet opening, so that a vacuum-pressure area is created adjacent to the outlet opening, and that a supporting ring which extends in the radial direction is provided on the housing and has a plurality of outlet openings which point towards the measurement surface.

This measurement probe has the advantage that the outlet opening, pointing towards the measurement surface, of the measurement probe, which supplies at least one emerging mass flow of a gaseous medium to a measurement surface, allows non-contacting measurement with respect to the measurement surface at the intended measurement point. The outlet opening is connected via the connection channel to the supply opening in the housing, via which outlet opening the gaseous medium is supplied. This arrangement keeps the measurement probe floating above the measurement surface, and the thickness of thin layers is measured at the same time without any disadvantageous influence on the measurement surface, owing to the floating arrangement.

A further advantage is achieved by providing the outlet opening to be provided on the longitudinal axis of the housing, and the sensor element being arranged concentrically with respect to the outlet opening. This refinement allows the mass flow of gaseous medium to emerge centrally with respect to the measurement surface, so that the emerging medium flows away uniformly in a radial direction along the measurement surface. This allows a simple design, in which the generally rotationally symmetrical measurement probes can retain their geometry and symmetry.

Furthermore the outlet opening, which is located on the longitudinal axis of the housing and is provided on a projection, which is in the form of a cup and points towards the measurement surface, on the end surface of the measurement probe has the advantage that the distance to the measurement surface increases immediately adjacent to the outlet opening, thus resulting in a vacuum pressure and counteracting the repulsion force of the emerging mass flow.

A supporting ring which extends in the radial direction is provided on the housing of the measurement probe and has a plurality of outlet openings which point towards the measurement surface and are connected via preferably one annular connection channel to one or more supply openings. A supporting ring such as this has the advantage that it allows mass flows to emerge separately, in order to arrange the measurement probe such that it floats with respect to the measurement surface. Particularly in the case of large or heavy measurement probes or highly sensitive measurement surfaces, this makes it possible to form an air cushion in order to position the measurement probe at the stable operating point, in particular irrespective of the sensor element.

The connection channel of the outlet opening preferably has a first hole section, which is directed into the housing interior and whose length corresponds at least to the height of the sensor element. The method of operation of the sensor element can thus be retained, and the previous design can be used with the exception of the introduction of a hole section such as this. For example, pot cores can be used which hold coil formers and screen them from the outside. In this case, the inner pole of the pot core is provided with the hole section, with the magnetic field that emerges at the inner pole not being influenced by this hole section.

According to this first embodiment, the first hole section in the sensor element is advantageously connected to a lateral hole, which is adjacent to the sensor element or is located outside the sensor element, and to an annular channel or pierced hole which is connected to the at least one supply opening. This allows a simple design, allowing the measurement probe to be physically compact.

The sensor element is preferably held in the housing of the measurement probe by means of an air bearing. An air bearing such as this makes it possible to provide an arrangement between the sensor element and the housing that is not subject to tilting or canting, thus allowing the required distance that is suitable for the measurement to the measurement surface to be kept small, and the measurement probe to be provided such that it holds itself in position with respect to the measurement surface. This allows an exact measurement to be carried out.

According to a further advantageous refinement to the invention, the sensor element is supplied with a separate mass flow of a gaseous medium. The sensor element can thus be driven with its own mass flow independently of further elements, as will be described in the following text, thus allowing exact adjustment of the sensor element in order to measure the thickness of thin layers, irrespective of the other external conditions and further mass flows.

The supporting ring can advantageously form an outer system which is supplied with a separate mass flow from the inner system, which is formed by the sensor element on an air bearing in the housing.

According to one alternative embodiment of the measurement probe, a plurality of further outlet openings are provided, and are arranged concentrically with respect to the longitudinal axis of the housing. These outlet openings are preferably distributed uniformly over the circumference thus allowing a uniform outlet flow in order to achieve the stable operating point. Outlet openings such as these may be designed such that the outlet flow direction of the mass flow is directed at right angles to the measurement surface. Alternatively, it is possible to provide for the outlet direction of the mass flow to be at an angle of other than 90° to the measurement surface. By way of example, all of the outlet openings can be provided at an angle to the outer edge area, so that the angle between the outlet direction of the mass flow from the outlet direction and the outlet-flow direction of the mass flow in the radial direction after striking the measurement surface is greater than 90°.

In both of the abovementioned embodiments of the measurement probe, the sensor element is advantageously arranged fixed in the housing.

According to one alternative refinement to the invention, the at least one sensor element is mounted such that it floats with respect to the housing via an air cushion. This makes it possible for the mass to be held at the operating point to be less than would be the case with a sensor element arranged fixed in the housing. Further, in addition, tolerances in the positioning of the housing with respect to the measurement surface can automatically be compensated for by the floating bearing of the sensor element.

According to one preferred embodiment of the measurement probe, an outer edge area is provided on an end surface, pointing towards the measurement surface, of the housing or of the sliding shoe and is designed such that the distance between the end surface and the measurement surface increase outwards. An outer edge area such as this may be formed by a straight line, a rounded area or a curvature with a second- or third-degree function. This outer edge area is used to produce a vacuum pressure which counteracts the outlet-flow force of the mass flow from the outlet opening or openings and preferably results in an increase in the stable equilibrium.

According to a further advantageous embodiment of the invention, a rocker, preferably having an eddy-current brake, and on whose free arm the measurement probe is held, is provided for positioning the sensor element at a measurement point on the measurement surface. This makes it possible to position the measurement probe with respect to the measurement surface smoothly and without any jerking, while at the same time allowing the measurement probe to be positioned automatically at the stable operating point.

BRIEF DESCRIPTION OF THE DRAWINGS

The invention as well as further advantageous embodiments and developments of it will be described and explained in more detail in the following text with reference to the examples which are illustrated in the drawings. In the figures.

DETAILED DESCRIPTION OF PREFERRED EMBODIMENTS

Figure 1:
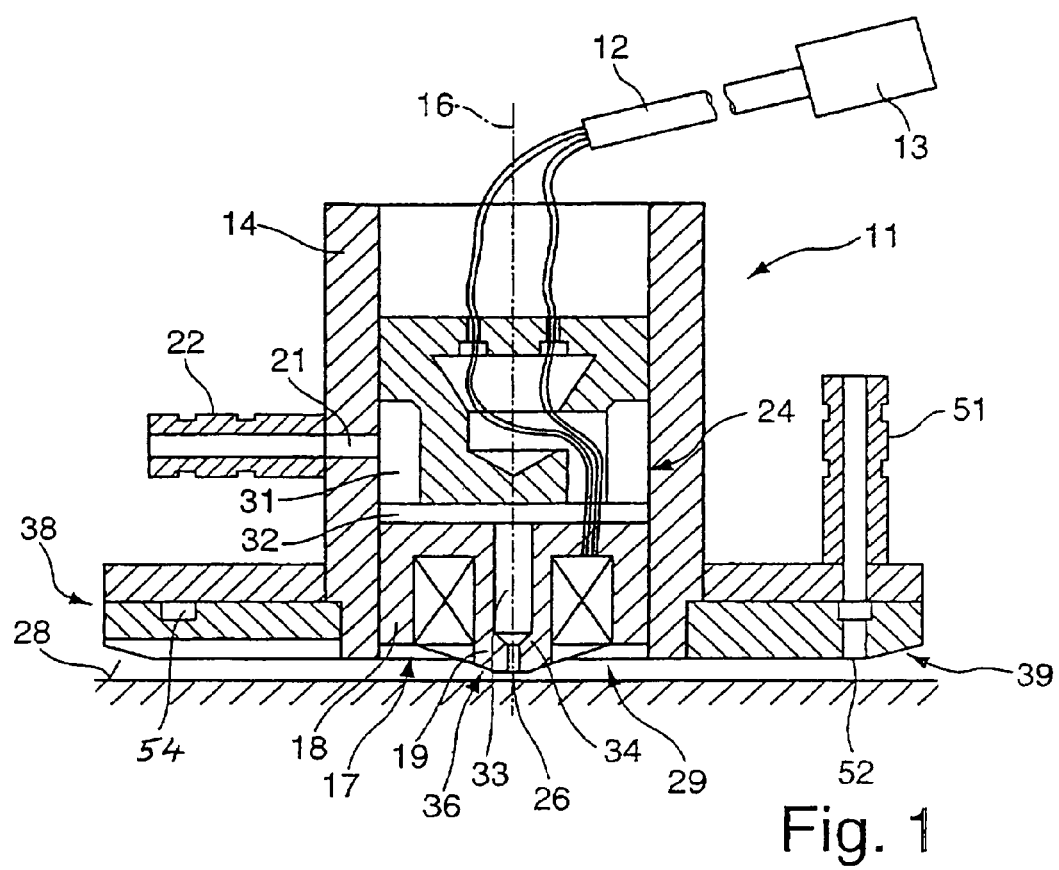
FIG. 1 shows a schematic section illustration of a first embodiment according to the invention.

FIG. 1 shows a measurement probe 11 which is connected via a connection line 12 to an apparatus 13 for measurement of the thickness of thin layers and for evaluation of the measurement data. The measurement probe 11 may alternatively be part of this apparatus 13, in the form of a stationary appliance or a handheld appliance. This measurement probe 11 is used for non-destructive and non-contacting layer-thickness measurement.

The measurement probe 11 has a housing 14 which, in particular is cylindrical. At least one sensor element 17 is arranged on a longitudinal axis 16 of the housing 14. This sensor element 17 is firmly connected to the housing 14 in the exemplary embodiment shown in FIG. 1.

The sensor element 17 is formed, for example, by a primary coil and a secondary coil with a magnet, or is in the form an unscreened dipole. A pot core 18 having at least one coil is provided on an inner pole 19 in the exemplary embodiment. A sensor element 17 such as this allows measurement based on the magnet-inductive process. The magnet-inductive measurement process is suitable for measurement of non-ferrous metallic layers, such as chromium, copper, zinc or the like on magnetic base materials, such as steel or iron, and for paint, lacquer and plastic layers on magnetic base material such as steel or iron. By way of example, the measurement range is up to a layer thickness of 1800 µm, preferably using a frequency of less than 300 Hertz.

Alternatively, it is possible to provide for the at least one sensor element 17 to comprise a coil. A sensor element 17 such as this makes it possible to use the eddy-current method, that is to say this makes it possible to measure the thickness of electrically non-conductive layers on non-ferrous metals, such as paints, lacquers, plastics, on aluminum, brass or stainless steel, or other anodized layers, with a radio-frequency alternating field. The measurement range may likewise be up to a layer thickness of 1800 µm.

The measurement probe 11 has a supply opening 21 on the housing 14, to which a connection 22 is fitted. This holds a flexible tube, which is not illustrated in any more detail, via which a gaseous medium is supplied to the supply opening 21 from a supply source, which is not illustrated in any more detail. Air is preferably used as the gaseous medium, in particular in a dust-free form and/or with oil having been removed from it. Alternatively, other non-explosive gases can also be used. The supply opening 21 is connected via a connection channel 24 to an outlet opening 26 which is provided on an end face 29, arranged with respect to the measurement surface 28, of the measurement probe 11, in particular of the sensor element 17. The connection channel 24 which is connected to the supply opening 21 is in the form of an annular channel 31, which merges into a lateral hole 32 in order that a first hole section 33 is supplied with a mass flow of the gaseous medium. This first hole section 33 is located on the longitudinal axis 16 of the sensor element 17 or of the housing 14, and allows the mass flow to emerge centrally from the measurement probe 11 via the inner pole 19. The first hole section 33 has a taper 34, which is in the form of a nozzle and merges into the outlet opening 26, in the lower area. The mass flow emerges from the outlet opening 26, and flows away radially along the measurement surface 28.

The outlet opening 26 is provided on a projection 36 in the form of a cup, thus resulting in the distance between the outlet opening 26 and the measurement surface 28 being increased adjacent to it, so that a vacuum-pressure area is created, adjacent to the outlet opening 26.

The pressure of the mass flow which emerges and is directed at the measurement surface 28 is used to adjust the distance between the sensor element 17, which is arranged such that it floats with respect to the housing 14 or has a central air bearing, and the measurement surface 28, creating an equilibrium between the mass resulting from the weight of the measurement probe 11 and the vacuum pressure acting on it, as a result of the mass flow flowing away on the one hand and the resetting force of the mass flow on the other hand, which results from the mass flow striking the measurement surface 28.

A non-contacting measurement of the thickness of the layer at a defined distance from the measurement surface 28 can be carried out at the stable operating point. In consequence, dirty surfaces, such as oily or greasy surfaces, as well as moist or wet surfaces, have no disadvantageous effect on the layer-thickness measurement. Furthermore, recordings can also be made on soft coatings without mechanical deformation of the measurement surface 28. Layers which are not yet completely cured can likewise be measured.

A supporting ring 38 is provided on the lower housing edge of the housing 14, preferably as a separate outer system for the sensor element 17 which surrounds the inner system, and in the central or outer edge area has outlet openings 52 which are arranged on a lower face of the supporting ring 38 pointing towards the measurement surface 28. A mass flow of the gaseous medium is supplied to the supporting ring 38 via a supply opening 51 and, via an annular gap which is in the form of a connection channel 54, supplies a plurality of outlet openings 52, which are preferably distributed uniformly over the circumference. By way of example, one supply opening 51 is sufficient to supply a mass flow to a plurality of outlet openings 52 via the annular gap. If an increased mass flow is required, a plurality of supply openings 51 may also be provided, in order to feed the gaseous medium to the connection channel or channels 24.

The separation between the outer system and the inner system makes it possible for the measurement probe 11 to be held by the outer system such that it floats above the measurement surface 28, and for the sensor element 17 to assume a self-holding measurement position, independently of this, in which position the distance to the measurement surface is considerably less than in the case of a lower face of the supporting ring 38 of the outer system. In consequence, the magnetic field is passed via the inner pole 19 to the measurement surface of the measurement object without spreading out, thus resulting in good resolution in order to increase the measurement accuracy. The central supply of the mass flow via the hole sections 33 and 26 in the inner pole 19 in this case does not influence the magnetic field, or influences it only to a negligible extent.

An outer edge area 39 of the supporting ring 38, which points towards the measurement surface 28, is designed such that the distance to the measurement surface 28 increases outwards. This makes it possible to produce a vacuum pressure which can be used to assist the assumption of the stable operating point.

An alternative embodiment to that shown in FIG. 1, which is not illustrated in any more detail, may, in addition to the first hole section 33 or as an alternative to the first hole section 33, have one or more hole sections which run parallel in the outer edge area between the housing 14 and the sensor element 17, or the outer edge area of the sensor element 17, such that further outlet openings 26, pointing towards the measurement surface 28, are supplied with a mass flow via the annular channel 31.

An alternative embodiment to that shown in FIG. 1, which is likewise not illustrated in any more detail, can be provided by providing a fixed arrangement of the sensor element 17 with respect to the housing 14, instead of the sensor elements 17 being mounted in a floating manner, with the supply of the mass flow via the supply opening 21 at the connection 22 as well as that of the supply opening 21 then being matched to one another in order to assume an optimum measurement distance in a self-holding manner, with the sensor element 17 being held with respect to the measurement surface 28, without making contact with it.

What is claimed is:

1. A measurement probe for an apparatus for measurement of the thickness of thin layers, the measurement probe having a housing which holds at least one sensor element whose longitudinal axis lies on a longitudinal axis of the housing, a supply opening to which a connection for supplying a gaseous medium is fitted, and which has an outlet opening which is provided on an end face of the measurement probe, pointing towards a measurement surface, and having a connection channel, which connects the supply opening to the outlet opening, wherein the outlet opening is provided on the longitudinal axis of the housing, and the sensor element is arranged concentrically with respect to the outlet opening, and the outlet opening is provided on a cup-shaped projection on said one end face of the sensor element, thus resulting in the distance between the measurement probe and the measurement surface being increased adjacent to the outlet opening, so that a vacuum-pressure area is created adjacent to the outlet opening, and that a supporting ring which extends in the radial direction is provided on the housing and has a plurality of outlet openings which point towards the measurement surface.

2. A measurement probe according to claim 1, wherein the connection channel has a first hole section, which is directed from the outlet opening into the housing interior and whose length corresponds at least to the height of the sensor element, which is preferably in the form of a pot core with a cylindrical inner pole, with the inner pole having the first hole section.

3. A measurement probe according to claim 2, wherein the first hole section opens into a lateral hole and is connected to an annular channel in order to form the connection channel, or wherein the first hole section is connected to a pierced hole which opens into the supply opening.

4. A measurement probe according to any one of claims 1, 2 or 3, wherein the sensor element is arranged in the housing such that it can be moved longitudinally by means of a central air bearing.

5. A measurement probe according to claim 1, wherein the outlet openings of the supporting ring are connected, preferably via an annular connection channel, to a supply opening.

6. A measurement probe according to claim 1, further comprising a plurality of further outlet openings which are arranged concentrically with respect to the longitudinal axis of the housing and are provided on said end surface of the measurement probe.

7. A measurement probe according to claim 1, wherein the sensor element is fixed to the housing.

8. A measurement probe according to claim 1, wherein the sensor element is mounted such that it floats with respect to the housing, by means of a cushion of gaseous medium.

9. A measurement probe according to claim 1, wherein an outer edge area whose distance from the measurement surface increases towards the outside is provided on said supporting ring, pointing towards the measurement surface.

10. A measurement probe according to claim 1, wherein a rocker, preferably having an eddy-current brake, and on whose free arm the measurement probe is held, is provided for positioning the sensor element at a measurement point on the measurement surface.

\* \* \* \* \*